United States Patent
Li et al.

(10) Patent No.: US 8,300,066 B2
(45) Date of Patent: Oct. 30, 2012

(54) MOBILE TERMINAL AND METHOD FOR DISPLAYING IMAGES THEREON

(75) Inventors: Xiao-Guang Li, Shenzhen (CN); Tsung-Fu Huang, Taipei Hsien (TW)

(73) Assignees: Hong Fu Jin Precision Industry (ShenZhen) Co., Ltd., Shenzhen, Guangdong Province (CN); Hon Hai Precision Industry., Ltd., Tu-Cheng, New Taipei (TW)

( * ) Notice: Subject to any disclaimer, the term of this patent is extended or adjusted under 35 U.S.C. 154(b) by 757 days.

(21) Appl. No.: 12/535,039

(22) Filed: Aug. 4, 2009

(65) Prior Publication Data
US 2010/0118054 A1    May 13, 2010

(30) Foreign Application Priority Data
Nov. 10, 2008    (CN) .......................... 2008 1 0305457

(51) Int. Cl.
*G09G 5/00* (2006.01)
(52) U.S. Cl. ...................................................... 345/656
(58) Field of Classification Search .................. 345/649, 345/656
See application file for complete search history.

(56) References Cited

U.S. PATENT DOCUMENTS

| | | | |
|---|---|---|---|
| 5,389,745 A | 2/1995 | Sakamoto | |
| 7,376,286 B2 * | 5/2008 | Locker et al. | 382/296 |
| 7,511,722 B1 * | 3/2009 | Ollmann | 345/649 |
| 8,217,964 B2 * | 7/2012 | Laine et al. | 345/659 |
| 2005/0074170 A1 | 4/2005 | Debrito | |
| 2006/0187239 A1 * | 8/2006 | Clark-Lindh | 345/659 |

FOREIGN PATENT DOCUMENTS

| | | |
|---|---|---|
| CN | 1385824 A | 12/2002 |
| CN | 1534589 A | 10/2004 |
| JP | 11-196397 | 7/1999 |
| JP | 2008244707 A | 10/2008 |
| TW | 200535753 | 11/2005 |
| TW | 200627374 | 8/2006 |

* cited by examiner

*Primary Examiner* — Ryan R Yang
(74) *Attorney, Agent, or Firm* — Altis Law Group, Inc.

(57) ABSTRACT

A mobile terminal includes a first and a second storage modules. The first storage module stores a plurality of display images, layout data and resource files corresponding to different display states. The second storage module stores the plurality of layout data and resources files read from the first storage module when the mobile terminal is powered on. If the module terminal has been reoriented, the mobile terminal determines if a current image needs to be changed and generates an interface change event if the current image needs to be changed. Then, the mobile terminal reads corresponding layout data and resource file from the second storage module, reads a corresponding display image from the first storage module according to the read resource file, generates a redraw command, and sends the redraw command and the read layout data and the read display image to a display module to display a new image.

14 Claims, 3 Drawing Sheets

MOBILE TERMINAL AND METHOD FOR DISPLAYING IMAGES THEREON

BACKGROUND

1. Technical Field

The disclosure relates to mobile terminals, and particularly to a mobile terminal with a display and method for displaying images thereon.

2. Description of Related Art

Electronic devices with a display screen, such as mobile terminals, often display images in a single orientation, unchanged relative to the position of the electronic device. For example, if an electronic device normally displays images in a horizontal orientation, when the orientation of the electronic device changes, for example to a vertical orientation, the display remains in the horizontal orientation. In order to view the display properly, users must re-orient their viewing position, an inconvenient requirement.

DETAILED DESCRIPTION

Figure 1:
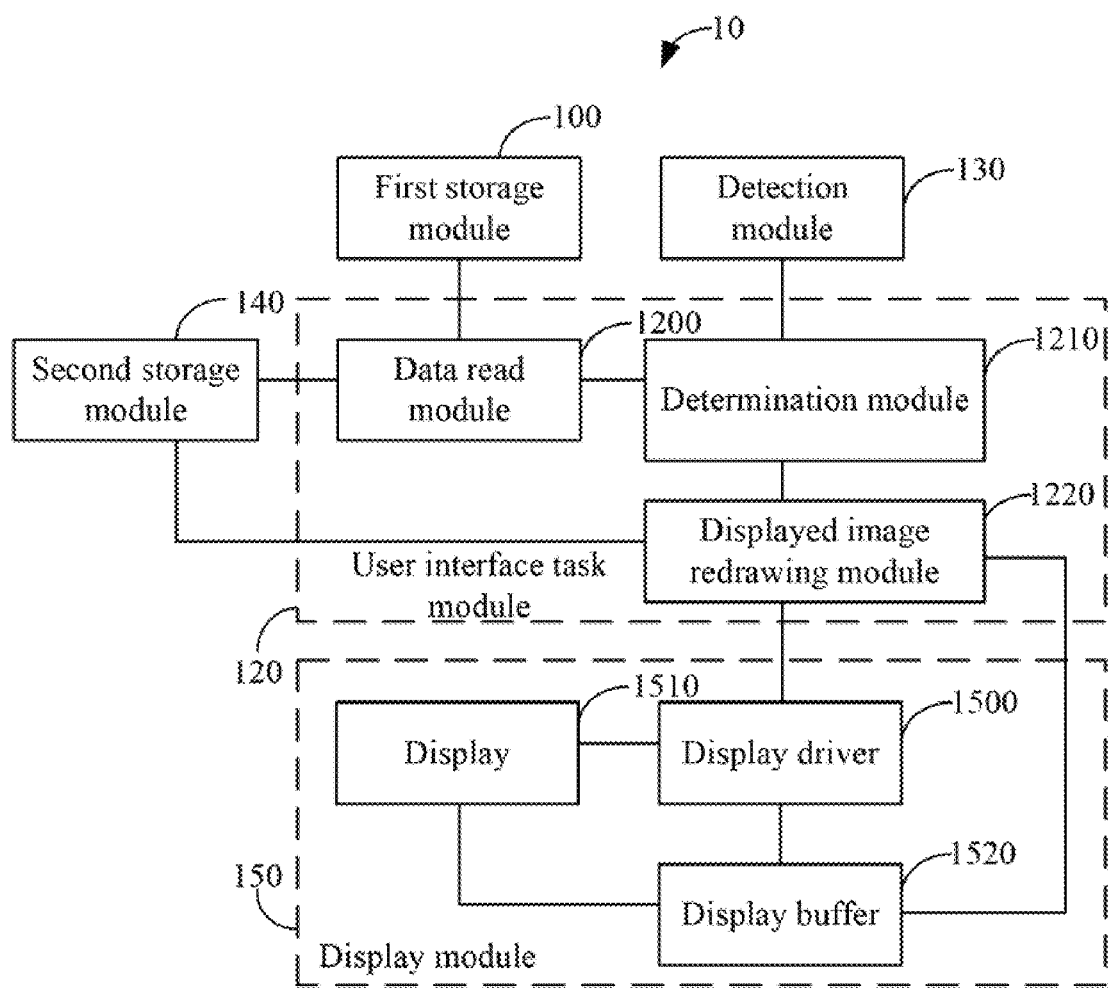
FIG. 1 is a schematic diagram of one embodiment of a mobile terminal as disclosed.
Figure 2:
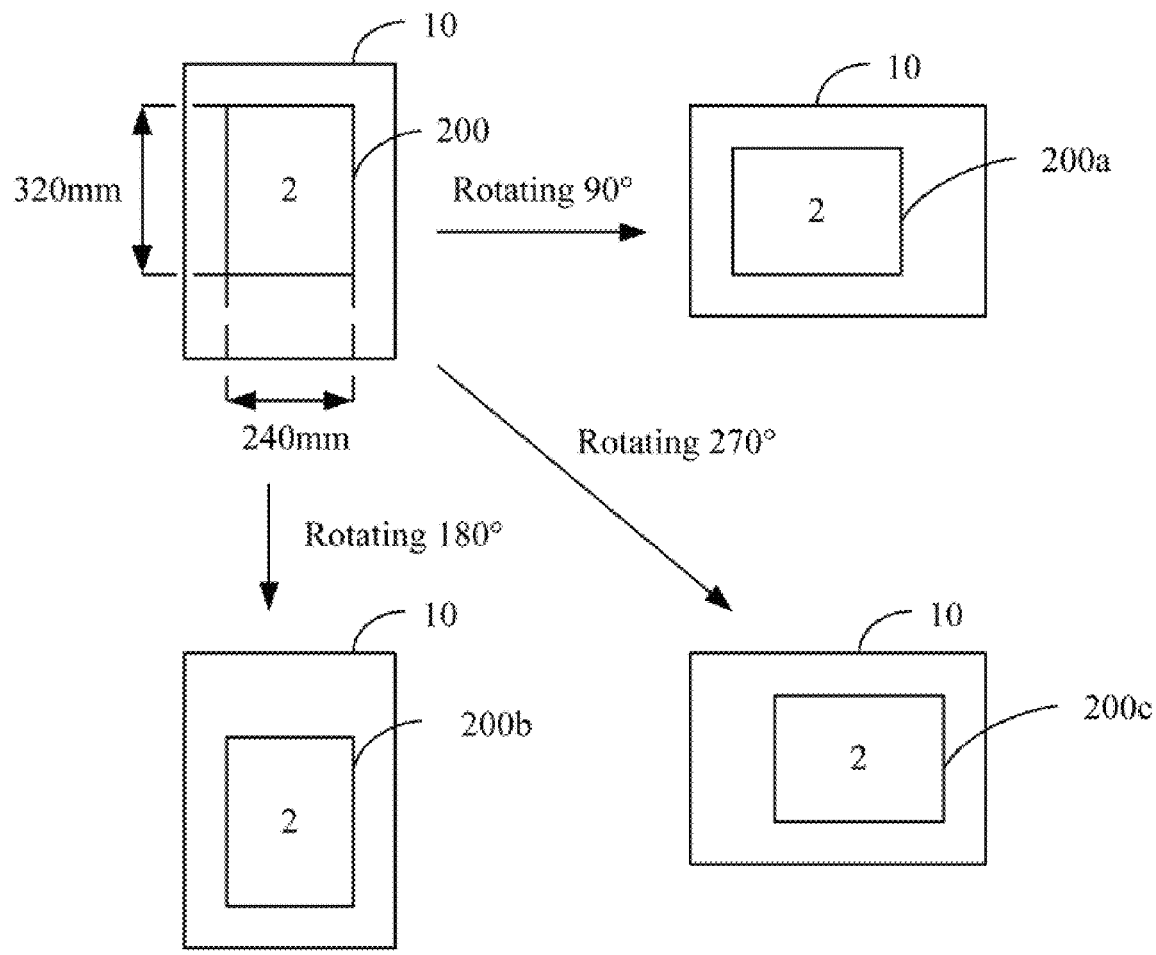
FIG. 2 is a schematic diagram illustrating rotation of the mobile terminal of FIG 1 and a displayed image displayed thereon.

FIG. 1 is a schematic diagram of one embodiment of a mobile terminal 10 as disclosed. In one embodiment, the mobile terminal 10 may be a mobile phone, a personal digital assistant, or a portable computer, for example, displaying images. When the mobile terminal 10 rotates, a displayed image 200 also rotates accordingly. For example, as shown in FIG. 2, when the mobile terminal 10 rotates 90°, from a vertical orientation to a horizontal orientation, a displayed image 200 also rotates 90° relative to the mobile terminal 10, and becomes a rotated image 200a. It may be understood that the images 200 and 200a in FIG. 2 are exemplary and may include others depending on the embodiment. Irrespective of mobile terminal 10 rotation, a display state thereof the mobile terminal 10 includes a vertical display state, like a state of the images 200 and 200b in FIG. 2, and a horizontal display state, like a state of the images 200a and 200c in FIG. 2. In this embodiment, a default display state of the mobile terminal 10 when powered on is the vertical display state.

In one embodiment, the mobile terminal 10 includes a first storage module 100, a user interface task module 120, a detection module 130, a second storage module 140, and a display module 150. The first storage module 100 stores a plurality of display images, layout data and resource files of the mobile terminal 10 corresponding to different display states. That is, the first storage module 100 store one group of display images, layout data and resource files corresponding to the vertical display state and another group of display images, layout data and resources files corresponding to the horizontal display state. The plurality of resource files includes file names and storage paths of the plurality of display images. The layout data includes heights and widths of the plurality of display images. In one embodiment, the layout data of the plurality of display images in the vertical display state is the same, and the layout data of the plurality of display images in the horizontal display state is also the same.

The first storage module 100 can store data for a long period of time without power, and may be a flash memory system. In one embodiment, the plurality of display images include display images of the mobile terminal 10 corresponding to different working states, for example, an idle state, a calling state, and a phonebook browsing state.

The display module 150 displays images, such as an idle image, a calling image, and a phonebook browsing image. The idle image, the calling image, and the phonebook browsing image are representational images of various states of the mobile terminal 10. The display module 150 includes a display driver 1500, a display 1510, and a display buffer 1520. The display 1510 displays a current image selected from the plurality of display images. The display driver 1500 drives the display 1510. The display buffer 1520 temporarily stores layout data and a display image corresponding to the current image. In one exemplary embodiment, the layout data includes height and width of the display image corresponding to the current image, for example, height of 320 mm and width of 240 mm.

The detection module 130 detects a new orientation of the mobile terminal 10. In one exemplary embodiment, the mobile terminal 10 may be conventionally used vertically, but in some conditions, such as browsing pictures, the mobile terminal 10 may be rotated. In this disclosure, the detection module 130 may be a three axis accelerometer, such as, the ADXL330 chipset of Analog Devices, Inc.

The user interface task module 120 processes user interface operation, and includes a data read module 1200, a determination module 1210, and a displayed image redrawing module 1220.

The data read module 1200 reads the plurality of layout data and resources files from the first storage module 100 when the mobile terminal 10 is powered on, and stores the read layout data and resources files in the second storage module 140.

The second storage module 140 stores the read layout data and resource files from the data read module 1200. Because when the mobile terminal 10 is powered on, the data read module 1200 only reads and stores the plurality of layout data and resource files in the second storage module 140, without the plurality of display images, processing speed is accelerated and a waiting period for power up of the mobile terminal 10 is reduced. The second storage module 1200, storing data when the mobile terminal 10 is powered on, may be a memory system. In one embodiment, the second storage module 140 uses a tree structure to store the read layout data and resource files. For example, one tree may represent the vertical display state of the mobile terminal 10, all branches of which include layout data and resource files corresponding to the vertical display state. There also may be another tree representing the horizontal display state of the mobile terminal 10, all branches of which include layout data and resource files corresponding to the horizontal display state.

The determination module 1210 determines if the current image displayed on the display 1510 needs to be changed according to the detected orientation of the mobile terminal 10. If the current image needs to be changed, the determination module 1210 generates and sends an interface change event to the displayed image redrawing module 1220. In one embodiment, the interface change event includes the detected orientation. The determination module 1210 determines the need for the current image to be rotated relative to the mobile terminal 10 when the detected orientation conforms to a predetermined position. Thus, the mobile terminal 10 display repositions for optimum viewing. The predetermined position may be 45° from the original orientation, or others according to actual need, for example, 90°.

The displayed image redrawing module 1220 receives the interface change event, reads corresponding layout data and resource file from the second storage module 140 according to the interface change event, and further reads a corresponding display image from the first storage module 100 according to the read resource file. The displayed image redrawing module 1220 further generates a redraw command, and sends the redraw command and the read layout data and the read display image to the display module 150 to generate a new image accordingly. In one embodiment, the displayed image redrawing module 1220 further stores the read layout data from the second storage module and the read display image from the first storage module in the display buffer 1520. The displayed image redrawing module 1220 further sets a state parameter according to the interface change event and reads the corresponding layout data and resource file according to the state parameter. In one embodiment, the redraw command includes the state parameter, which represents a current orientation of the mobile terminal 10.

For example, it is assumed that the mobile terminal 10 is originally used vertically and the predetermined position is 45° therefrom. If a position of the mobile terminal 10 is between 0° and 45°, or between 315° and 360° therefrom, the determination 1210 determines no need to generate a new image, and the state parameter is 0. If the position is between 45° and 135°, the determination module 1210 determines a need to generate a new image, and the state parameter is set to 1. If the position is between 135° and 225°, the determination module 1210 determines a need to generate a new image, and the state parameter is set to 2. If the position is between 225° and 315°, the determination module 1210 determines a need to generate a new image, and the state parameter is set to 3.

The display driver 1500 further receives the redraw command, remaps coordinates of the current image according to the state parameter, and forms and sends the new image to the display 1510 according to the layout data and the display image in the display buffer 1520 from the displayed image redrawing module 1220. For example, still referring to FIG. 2, the mobile terminal 10 is originally used vertically, displaying an original image 200 with height of 320 mm and width of 240 mm. If the state parameter is changed from 0 to 1, that is, the position of the mobile terminal 10 is between 45° and 135° from the original orientation, the display driver 1500 remaps a coordinate (0,320) of the image 200 to be (0,0) and a coordinate (0,0) of the image 200 to be (320,0), and forms a new image 200a being the image 200 rotated 90° relative to the mobile terminal 10. If the state parameter is changed from 0 to 2, that is, the position of the mobile terminal 10 is between 135° and 225° from the original orientation, the display driver 1500 remaps a coordinate (240,320) of the image 200 to be (0,0) and a coordinate (0,0) of the image 200 to be (240,320), and forms a new image 200b being the image 200 rotated 180° relative to the mobile terminal 10.

If the state parameter is changed from 0 to 3, that is, the position of the mobile terminal 10 is between 225° and 315° from the original orientation, the display driver 1500 remaps a coordinate (240,0) of the image 200 to be (0,0) and a coordinate (0,0) of the image 200 to be (0,240), and forms a new image 200c being the image 200 rotated 270° relative to the mobile terminal 10. In one embodiment, the images 200 and 200b are images in the vertical display state of the mobile terminal 10, and the images 200a and 200c are images in the horizontal display state of the mobile terminal 10. That is, a current image rotated 0° and 180° relative to the mobile terminal 10 is a displayed image in the vertical display state, and a current image rotated 90 and 270 relative to the mobile terminal 10 is a displayed image in the horizontal display state.

Figure 3:
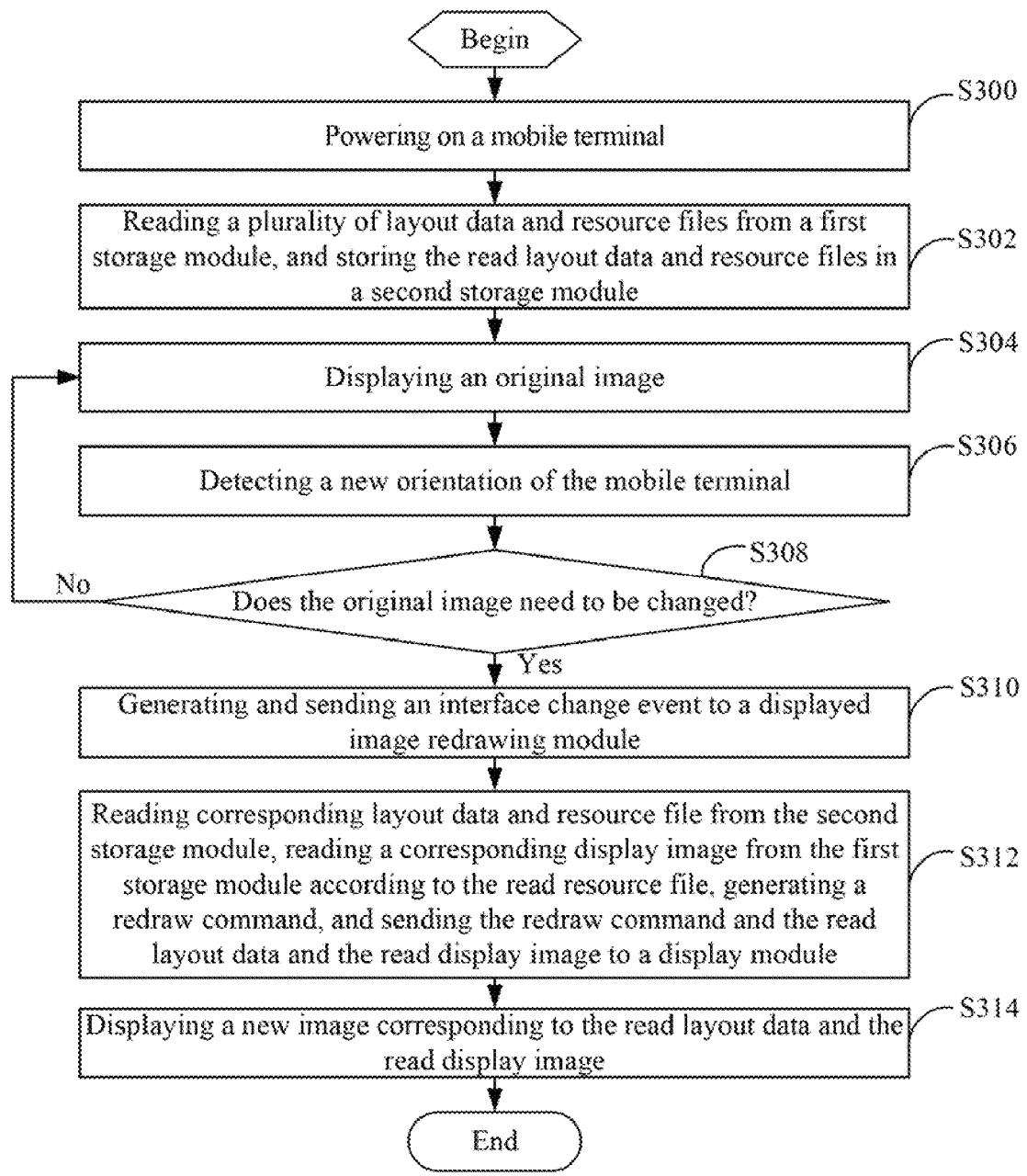
FIG. 3 is a flowchart of one embodiment of a method for displaying images as disclosed.

FIG. 3 is a flowchart of a method for displaying images on the mobile terminal 10, which changes a displayed image of the mobile terminal 10 relative to the position of mobile terminal 10. In block S300, the mobile terminal 10 is powered on. In block S302, the data read module 1200 reads the plurality of layout data and resource files of the mobile terminal 10 from the first storage module 100, and stores the read layout data and resource files in the second storage module 140. In block S304, the display module 150 displays an original image selected from the plurality of display images.

In block S306, the mobile terminal 10 is repositioned, and the detection module 130 detects a new orientation of the mobile terminal 10. In block S308, the determination module 1210 determines if the original image needs to be changed according to the detected orientation. In one embodiment, the determination module 1210 determines the original image needs to be rotated relative to the mobile terminal 10 when the detected orientation reaches a predetermined position. If the original image does not need to be changed, block S304 is repeated.

If the original image needs to be changed, in block S310, the determination module 1210 generates and sends an interface change event to the displayed image redrawing module 1220. In one embodiment, the interface change event includes the detected orientation of the mobile terminal 10.

In block S312, the displayed image redrawing module 1220 receives the interface change event, reads corresponding layout data and resource file from the second storage module 140, and reads a corresponding display image from the first storage module 100 according to the read resource file, then generates a redraw command, and subsequently sends the redraw command and the read layout data and the read display image to the display module 150. In one embodiment, the displayed image redrawing module 1220 further sets a state parameter according to the interface change event, and reads the corresponding layout data and resource file according to the state parameter. The displayed image redrawing module 1220 stores the read layout data and the read display image in the display buffer 1520, and then sends the redraw command to the display driver 1500. The state parameter represents a current orientation of the mobile terminal 10, and the redraw command includes the state parameter.

In block S314, the display module 150 displays a new image corresponding to the read layout data and the read display image. In one embodiment, the display driver 1500 remaps coordinates of the original image according to the state parameter, forms the new image according to the read layout data and the read display image in the display buffer 1520, and sends the new image to the display 1510 to display. Thus, the original image of the mobile terminal 10 is automatically rotated relative to the mobile terminal 10.

An example of the method for displaying images referring to FIG. 2 follows. The mobile terminal 10 is powered on, displaying an original image 200 with height of 320 mm and width of 240 mm in a vertical display state. When the mobile terminal 10 is repositioned 90° from the original orientation, the detection module 130 detects the new position. Because the position exceeds the predetermined position, the determination module 1210 determines a need for the original image 200 to be changed, and generates and sends an interface change event including the position to the displayed image redrawing module 1220.

The displayed image redrawing module 1220 sets a state parameter as 1 according to the interface change event, and reads layout data and resource file corresponding to the horizontal display state from the second storage module 140. The displayed image redrawing module 1220 further reads a corresponding display image corresponding to the horizontal display state according to the read resource file, and generates a redraw command including the state parameter 1. The displayed image redrawing module 1220 stores the read layout data and the read display image corresponding to the horizontal display state in the display buffer 1520 to update those of the original image 200, and sends the redraw command to the display driver 1500.

After receiving the redraw command, the display driver 1500 remaps a coordinate (0,320) of the original image 200 to be (0,0) and a coordinate (0,0) of the original image 200 to be (320,0), and forms a new image 200a being the image 200 rotated 90° relative to the mobile terminal 10 according to the remapped coordinates and the layout data and display image in the display buffer 1520. Finally, the display driver 1500 sends the new image 200a to the display 1510 to display.

The mobile terminal 10 and the method for displaying images thereof presets two groups of layout data, resource files and display images corresponding to the vertical and horizontal display states. Thus, when the mobile terminal 10 is repositioned, layout data, resource file and display image corresponding to the display state are read to redraw a displayed image of the mobile terminal 10. In addition, only layout data and resource files are read from the first storage module 100 to the second storage module 140. Thus, when the mobile terminal 10 is repositioned, corresponding layout data and resource files can be quickly read from the second storage module 140 to transfer a corresponding display image from the first storage module 100, minimizing delay in generating he new image.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A mobile terminal comprising a display, comprising:
    a first storage module to store a plurality of display images, layout data and resource files corresponding to different display states of the mobile terminal, wherein the plurality of resource files comprise file names and storage paths of the plurality of display images;
    a data read module to read the plurality of layout data and resources files from the first storage module when the mobile terminal is powered on;
    a second storage module to store the read layout data and resource files;
    a display module to display a current image on the display, wherein the current image is selected from the plurality of display images;
    a detection module to detect a new orientation of the mobile terminal;
    a determination module to determine if the current image needs to be changed according to the detected orientation, and to generate an interface change event if the current image needs to be changed; and
    a displayed image redrawing module to read corresponding layout data and resource file from the second storage module according to the interface change event, and read a corresponding display image from the first storage module according to the read resource file, then generate a redraw command and send the redraw command and the read layout data and the read display image to the display module to drive the display module to display a new image on the display accordingly.

2. The mobile terminal of claim 1, wherein the first storage module comprises a flash memory system.

3. The mobile terminal of claim 1, wherein the second storage module comprises a memory system.

4. The mobile terminal of claim 1, wherein the displayed image redrawing module further sets a state parameter according to the interface change event, and reads the corresponding layout data and resource file according to the state parameter.

5. The mobile terminal of claim 4, wherein the display module comprises:
    a display driver to drive the display; and
    a display buffer to temporarily store layout data and a resource file corresponding to the current image.

6. The mobile terminal of claim 5, wherein the displayed image redrawing module further stores the read layout data from the second storage module and the read display image from the first storage module in the display buffer.

7. The mobile terminal of claim 6, wherein the display driver remaps coordinates of the current image according to the state parameter, and forms and sends the new image to the display according to the layout data and the display image in the display buffer.

8. The mobile terminal of claim 1, wherein the display states comprise a vertical display state and a horizontal display state.

9. The mobile terminal of claim 1, further comprising a user interface task module to platform the data read module, the determination module and the displayed image redrawing module.

10. A method for displaying images on a display of a mobile terminal, comprising:
    presetting a plurality of layout data, resource files, and display images corresponding to different display states of the mobile terminal in a first storage module;
    reading the plurality of layout data and resource files from the first storage module when the mobile terminal is powered on, and storing the plurality of layout data and resources files in a second storage module;
    displaying an original image on the display, the original image selected from the plurality of display images;
    detecting a new orientation of the mobile terminal;
    determining if the original image needs to be changed according to the detected orientation;
    generating an interface change event if the current image needs to be changed; and
    reading corresponding layout data and resource file from the second storage module according to the interface change event, and reading a corresponding display image from the first storage module according to the read resource file, then generating a redraw command, and sending the redraw command and the read layout data and the read display image to a display module; and
    displaying a new image on the display according to the read layout data and the read display image.

11. The method for displaying images of claim 10, wherein reading corresponding layout data and resource file from the second storage module comprises:
    setting a state parameter according to the interface change event; and reading the corresponding layout data and resource file according to the state parameter.

12. The method for displaying images of claim 11, wherein sending the redraw command and the read layout data and the read display image to a display module comprises;
 storing the read layout data and the read display image to a display buffer of the display module; and
 sending the redraw command to a display driver of the display module.

13. The method for displaying images of claim 12, wherein displaying a new image according to the read layout data and the read display image comprises:
 remapping coordinates of the original image according to the state parameter; and
 forming and sending the new image to the display according to the layout data and the display image in the display buffer.

14. The method for displaying images of claim 10, wherein the different display states of the mobile terminal comprise a vertical display state and a horizontal display state.

* * * * *